US009890751B2

(12) United States Patent
Matsubara et al.

(10) Patent No.: US 9,890,751 B2
(45) Date of Patent: Feb. 13, 2018

(54) AIR CLEANER HOSE

(71) Applicant: TOYOTA JIDOSHA KABUSHIKI KAISHA, Toyota-shi (JP)

(72) Inventors: Yuji Matsubara, Toyota (JP); Taro Hasegawa, Toyota (JP); Shinya Makihara, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 62 days.

(21) Appl. No.: 14/968,038

(22) Filed: Dec. 14, 2015

(65) Prior Publication Data

US 2016/0177889 A1 Jun. 23, 2016

(30) Foreign Application Priority Data

Dec. 22, 2014 (JP) ................................ 2014-258289

(51) Int. Cl.
*F02M 35/10* (2006.01)
*B01D 46/42* (2006.01)
*F02M 29/00* (2006.01)

(52) U.S. Cl.
CPC ............................ *F02M 35/10137* (2013.01); *F02M 35/10124* (2013.01)

(58) Field of Classification Search
CPC ........ B01D 46/42; F02M 29/00; F02M 29/04; F02M 35/10; F02M 35/10013; F02M 35/162; F02M 35/10196; F02M 35/10144
USPC ............. 55/385.3, 490, 502; 95/273; 96/108
See application file for complete search history.

(56) References Cited

U.S. PATENT DOCUMENTS

| | | | | |
|---|---|---|---|---|
| 6,814,772 B1 * | 11/2004 | Wake | F02M 35/0203 123/198 E |
| 2004/0112219 A1 * | 6/2004 | Leffel | B01D 53/0415 96/108 |
| 2004/0139708 A1 * | 7/2004 | Giacinto | F02M 29/04 55/385.3 |
| 2009/0126670 A1 | 5/2009 | Kado et al. | |

FOREIGN PATENT DOCUMENTS

| | | |
|---|---|---|
| CN | 104160139 A | 11/2014 |
| JP | 2000-205065 A | 7/2000 |
| JP | 2001-99023 | 4/2001 |
| JP | 2009-127425 | 6/2009 |
| JP | 2011-7133 | 1/2011 |
| WO | WO 2013/129998 A1 | 9/2013 |

* cited by examiner

*Primary Examiner* — Christopher P Jones
*Assistant Examiner* — Minh-Chau Pham
(74) *Attorney, Agent, or Firm* — Oblon, McClelland, Maier & Neustadt, L.L.P.

(57) ABSTRACT

An air cleaner hose is provided. The air cleaner hose includes a bellows part and a low-rigidity part. The low-rigidity part is in a region between the bellows part and one end of the air cleaner hose. The low-rigidity part is included in a part of the air cleaner hose in a circumferential direction, wherein the low-rigidity part is configured to have a buckling deformation such that a buckling load of the low-rigidity part with respect to a compressive load in an axial direction of the air cleaner hose is smaller than a buckling load of a region other than the low-rigidity part with respect to the compressive load.

6 Claims, 5 Drawing Sheets

AIR CLEANER HOSE

INCORPORATION BY REFERENCE

The disclosure of Japanese Patent Application No. 2014-258289 filed on Dec. 22, 2014 including the specification, drawings and abstract is incorporated herein by reference in its entirety.

BACKGROUND OF THE INVENTION

1. Field of the Invention

The invention relates to an air cleaner hose.

2. Description of Related Art

Conventionally, when cleaning and exchanging an air cleaner element housed in an air cleaner, it is necessary to dismount an air cleaner cap from an air cleaner case to open the air cleaner.

As disclosed in Japanese Patent Application Publication No. 2009-127425 (JP 2009-127425 A), an air cleaner hose connected with an air cleaner includes a bellows part. In a structure in which an air cleaner hose is connected with an air cleaner cap, when dismounting the air cleaner cap without removing the air cleaner hose from the air cleaner cap, the bellows part is elastically deformed so as to bend the air cleaner hose. For example, the air cleaner hose is bent upwardly, and the air cleaner cap is dismounted upwardly.

SUMMARY OF THE INVENTION

However, when another member such as a cowl is positioned in a space to which the air cleaner cap is dismounted (for example, an upper space), the air cleaner cap interferes with this another member, thus making it difficult dismount the air cleaner cap from the air cleaner case. Thus, an operation for opening the air cleaner becomes complex.

The invention provides an air cleaner hose that realizes an operation for opening an air cleaner while avoiding the air cleaner cap from interfering with another member.

According to one aspect of the invention, an air cleaner hose that is configured to be connected with an air cleaner cap including a bellows part and a low-rigidity part. The low-rigidity part is positioned in a region defined by the bellows part and one end of the air cleaner hose. The low-rigidity part is included in a part of the air cleaner hose in a circumferential direction, wherein the low-rigidity part is configured to have a buckling deformation such that a buckling load of the low-rigidity part with respect to a compressive load in an axial direction of the air cleaner hose is smaller than a buckling load of a region other than the low-rigidity part with respect to the compressive load.

According to the above aspect of the invention, when opening the air cleaner, an operator applies a compressive load to the air cleaner hose in the direction along the hose axis. Once the compressive load reaches the buckling load of the low-rigidity part, the buckling deformation happens in the low-rigidity part between the bellows part and the end part of the hose earlier than the rest of the parts. Thus, bending happens between the bellows part and the end part of the hose, and a linear dimension of the air cleaner hose in the direction along the hose axis is reduced. Then, the air cleaner cap moves in the direction along the hose axis by the reduced amount of the linear dimension of the air cleaner hose. This means that, even if there is another member such as a cowl positioned in a space for the air cleaner cap to dismount from the air cleaner case (for example, an upper space), it is possible to move the air cleaner cap to a position where the air cleaner cap do not face the another member. In this state, the bellows part is elastically deformed to bend the air cleaner hose (for example, bend upwardly). Then, the air cleaner cap is dismounted from the air cleaner case without interfering with another member, and the air cleaner is opened.

According to the above aspect of the invention, the low-rigidity part may be positioned between the bellows part and an end part of the air cleaner hose on a downstream side in an intake flow direction. A rib may be: provided on the air cleaner hose; projecting on a radially outer side of the air cleaner hose; and connected to the low-rigidity part on an upstream side in the intake flow direction.

In this structure, the part where the rib is formed is a part with relatively high rigidity. Generally, the end part of the hose on the downstream side in the intake flow direction is connected with a member having relatively high rigidity, such as an intake pipe. Thus, it is possible to give high rigidity to both sides of the low-rigidity part (both sides in the direction along the hose axis). Because of this, the compressive load is applied easily to the low-rigidity part, and the low-rigidity part has buckling deformation more easily.

According to the above aspect of the invention, rigidity of the rib may be higher than rigidity of the low-rigidity part.

According to the above aspect of the invention, the low-rigidity part may be thinner than the region other than the low-rigidity part in the circumferential direction.

According to this, it is possible to realize the low-rigidity part with a relatively simple structure.

According to the above aspect of the invention, the low-rigidity part may be provided on an upper side of the air cleaner hose.

In the invention, it is possible to reduce the linear dimension of the air cleaner hose in the direction along the hose axis by the buckling deformation of the low-rigidity part, thereby making it possible to move the air cleaner cap to a position where the air cleaner cap does not interfere with another member. Therefore, the operation for opening the air cleaner, which is carried out by bending the air cleaner hose due to the elastic deformation of the bellows part, becomes easy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
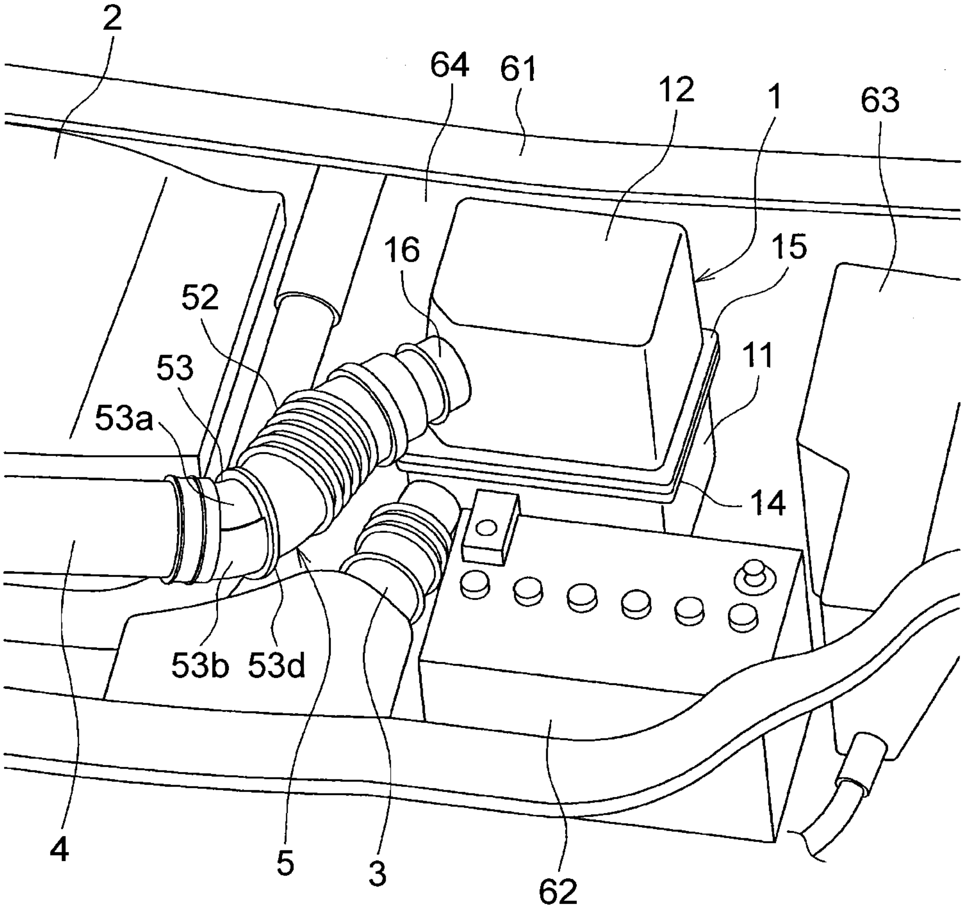
FIG. 1 is a perspective view showing a position where an air cleaner is arranged inside an engine compartment, and a periphery of the position.

An embodiment of the invention is explained below based on the drawings. FIG. 1 is a perspective view showing a position where an air cleaner 1 is arranged inside an engine compartment, and a periphery of the position. In FIG. 1, the lower side in the drawing is the front side of a vehicle body.

As shown in FIG. 1, an engine (not shown) is arranged in a central part inside of the engine compartment. In this embodiment, an upper side of the engine is covered by an engine cover 2.

The air cleaner 1 is arranged on the left side of the engine in a vehicle width direction (the right side in FIG. 1). The air cleaner 1 includes an air cleaner case 11 fixed to a vehicle body frame (not shown), and an air cleaner cap 12 mounted on an upper part of the air cleaner case 11. The air cleaner case 11 is a box on the lower side and also referred to as a lower case, and the air cleaner cap 12 is a box on the upper side, also referred to as an upper case. An air cleaner element 13 (see FIG. 6) is housed in a space inside the air cleaner that is formed from the air cleaner case 11 and the air cleaner cap 12. Specifically, the air cleaner element 13 is housed in a space inside the air cleaner case 11, and an upper side of the air cleaner case 11 is closed by the air cleaner cap 12. Flanges 14, 15, which are formed in outer edges of the air cleaner case 11 and the air cleaner cap 12, respectively, are superimposed on each other, and the flanges 14, 15 are engaged with each other by engaging tools (not shown). An example of the engaging tool is a clamp fitting.

An outside air introduction pipe (not shown) is formed integrally with the air cleaner case 11, and an inlet pipe 3 is connected with the outside air introduction pipe. The inlet pipe 3 extends to the front of the vehicle body, and a tip section of the inlet pipe 3 which is in an end part on the front side of the vehicle body is open towards the front of the vehicle body in the vicinity of a radiator (not shown).

Meanwhile, the air cleaner cap 12 and an intake pipe 4 of the engine are connected with each other by the air cleaner hose 5. A structure of the air cleaner hose 5 is described later. An outside air outlet pipe 16 is formed integrally with the air cleaner cap 12, and an end part of the air cleaner hose 5 on the upstream side of an intake flow is connected with the outside air outlet pipe 16. An end part of the air cleaner hose 5 on the downstream side of the intake flow is connected with the intake pipe 4 of the engine.

Therefore, outside air flown from the inlet pipe 3 into the air cleaner 1 is purified by passing through the air cleaner element 13 when flowing from the space inside the air cleaner case 11 to the space inside the air cleaner cap 12. Thereafter, the outside air goes through the air cleaner hose 5 and the intake pipe 4, and then flows into each cylinder of the engine.

A cowl 61 projects from an upper end of a dash panel 64 towards the front of the vehicle body. The dash panel 64 structures a rear wall of the engine compartment. A front end part of the cowl 61 covers a part of the upper side, which is an end part of the air cleaner cap 12 on the rear side of the vehicle body in a state where the air cleaner cap 12 is mounted on the air cleaner case 11, of the air cleaner 1.

A battery 62 is arranged in front of the air cleaner 1, and a fuse box 63 is arranged on a side of the air cleaner 1.

Figure 2:
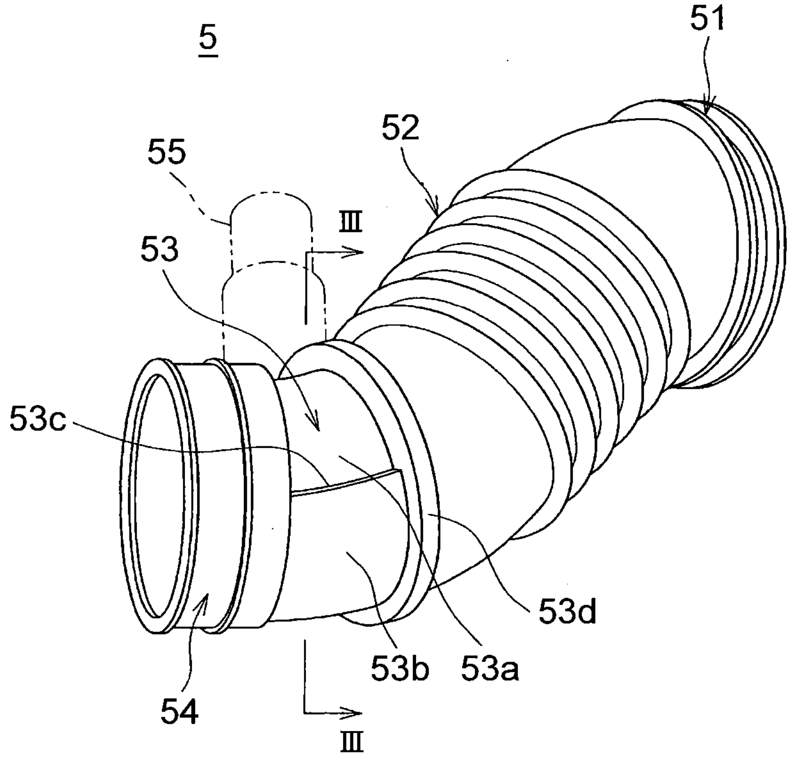
FIG. 2 is a perspective view of an air cleaner hose.

The air cleaner hose 5 is explained below. FIG. 2 is a perspective view of the air cleaner hose 5. The air cleaner hose 5 is formed from a rubber-based elastic body or a material such as flexible synthetic resin.

The air cleaner hose 5 includes an upstream-side fitting part 51, a bellows part 52, a deformation part 53, and a downstream-side fitting part 54 from an upstream side (the air cleaner 1 side) through a downstream side (the intake pipe 4 side) in an intake flow direction, and these parts 51 to 54 are formed integrally with each other.

The upstream-side fitting part 51 is a part that is fitted to the outside air outlet pipe 16 of the air cleaner cap 12. This means that upstream-side fitting part 51 is fitted to an outer circumference of the outside air outlet pipe 16, and fixed to the outside air outlet pipe 16 by being fastened by a hose band (not shown).

The downstream-side fitting part 54 is a part fitted to an upstream end of the intake pipe 4. This means that the downstream-side fitting part 54 is fitted to an outer circumference of the upstream end of the intake pipe 4, and is fixed to the upstream end of the intake pipe 4 by being fastened by a hose band (not shown).

The bellows part 52 is made by forming a plurality of bellows projections, and is elastically deformed for example, curved upwardly, thereby allowing the air cleaner hose 5 to bend. In the operation for opening the air cleaner 1, when dismounting the air cleaner cap 12 from the air cleaner case 11, the bellows part 52 is elastically deformed upwardly. Thus, the air cleaner hose 5 is bent upwardly. This means that, by elastically deforming the bellows part 52 so that a part of the bellows part 52 on the upstream side in the intake flow direction rises, a part of the air cleaner hose 5 on the upstream side of the in the intake flow direction rises. Details of the operation for opening the air cleaner 1 are described later.

Figure 3:
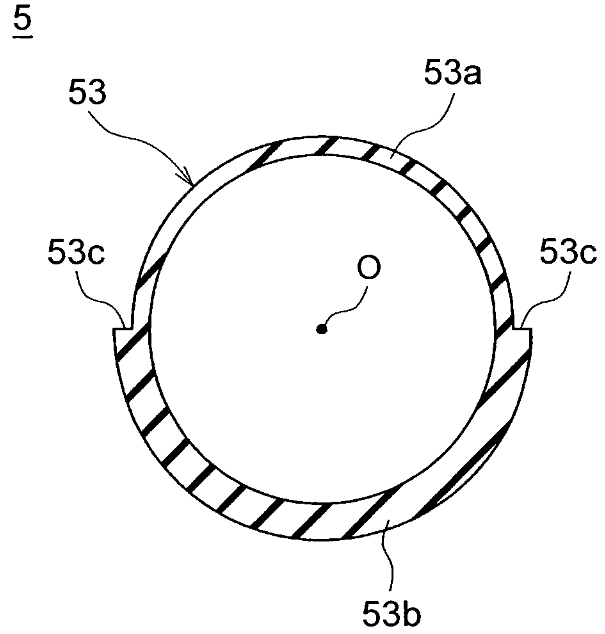
FIG. 3 is a sectional view taken along the line III-III in FIG. 2.

The air cleaner hose 5 is characterized in the deformation part 53. As shown in FIG. 2, the deformation part 53 is provided between the bellows part 52 and the downstream-side fitting part 54. FIG. 3 is a sectional view of the deformation part 53, which is a sectional view taken along the line III-III in FIG. 2, in other words, a sectional view in a direction orthogonal to a hose axis O. In the deformation part 53, an upper half region 53*a* and a lower half region 53*b* in a circumferential direction have different thickness dimensions. The upper half region 53*a* is a partial region in the circumferential direction at a location between the bellows part and the end part of the hose according to the invention. The lower half region 53*b* is the other region in the circumferential direction according to the invention. To be specific, a sectional shape of an inner peripheral surface of the deformation part 53 is a circle shape. On the contrary, in an outer peripheral surface of the deformation part 53, the radius of curvature of the upper half region 53*a* is set to be smaller than the radius of curvature of the lower half region 53*b*. In short, steps 53*c*, 53*c* are formed between the outer peripheral surface of the lower half region 53*b* and the outer peripheral surface of the upper half region 53*a*. The radius of curvature of the lower half region 53*b* from the steps 53*c*, 53*c* is larger than the radius of curvature of the upper half region 53*a* from the steps 53*c*, 53*c*. Therefore, the thickness dimension of the lower half region 53*b* of the deformation part 53 is set to be relatively larger than the thickness dimension of the upper half region 53*a* of the deformation part 53, and thus has higher rigidity. Herein below, the lower half region 53*b* of the deformation part 53 is referred to as a high-rigidity part 53*b*, and the upper half region 53*a* of the deformation part 53 is referred to as a low-rigidity part 53*a*.

For example, the thickness dimension of the high-rigidity part 53*b* is set to be 5 mm, whereas the thickness dimension of the low-rigidity part 53*a* is set to be 3 mm. These values are not limited to the above values, and are set as appropriate.

Because the low-rigidity part 53*a* and the high-rigidity part 53*b* are formed as stated above, a buckling load relative to a compressive load in a direction along the hose axis O is smaller in the low-rigidity part 53*a* than the high-rigidity part 53*b*. In short, when a compressive load is applied to the air cleaner hose 5 in the direction along the hose axis O, the low-rigidity part 53*a* has buckling deformation (elastic buckling deformation) earlier than the high-rigidity part 53*b* once the compressive load reaches the buckling load of the low-rigidity part 53*a*. Thus, when the low-rigidity part 53*a* has buckling deformation, a linear dimension of the air cleaner hose 5 in the direction along the hose axis O is reduced by an amount of the buckling deformation.

As shown in FIG. 2, connected to the deformation part 53 on the upstream side in the intake flow direction, a rib 53*d*, which projects radially outwardly, is formed integrally along the entire circumference in the circumferential direction. Due to the rib 53*d*, the part of the deformation part 53 on the upstream side in the intake flow direction has particularly high rigidity.

As stated above, rigidity of the low-rigidity part 53*a* is lower than rigidity of the high-rigidity part 53*b*. Also, a part where the rib 53*d* is formed is a part with higher rigidity than that of the low-rigidity part 53*a*. The downstream-side fitting part 54 of the air cleaner hose 5 is connected with the intake pipe 4 having higher rigidity than that of the low-rigidity part 53*a*. This means that parts with high rigidity are present on both sides (both sides in the direction along the hose axis O) of the low-rigidity part 53*a*. Therefore, if a compressive load acts on the deformation part 53 in the direction along the hose axis O, the compressive load is easily applied to the low-rigidity part 53*a*.

As shown in FIG. 2, a PCV port 55, shown by a virtual line, is connected with the air cleaner hose 5. The PCV port 55 is connected at a position in the high-rigidity part 53*b*.

Figure 4:
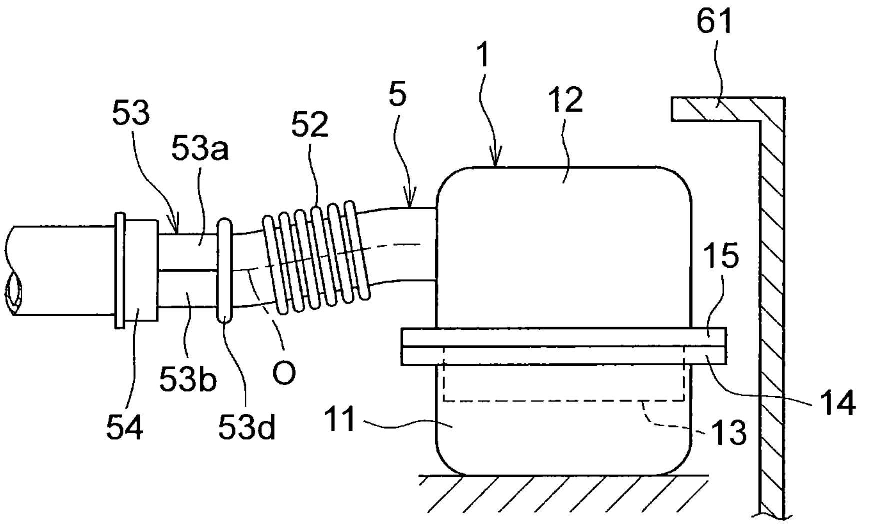
FIG. 4 is a schematic view for explaining an operation for opening the air cleaner, and is a view showing a state before buckling deformation happens in a low-rigidity part of the air cleaner hose.
Figure 5:
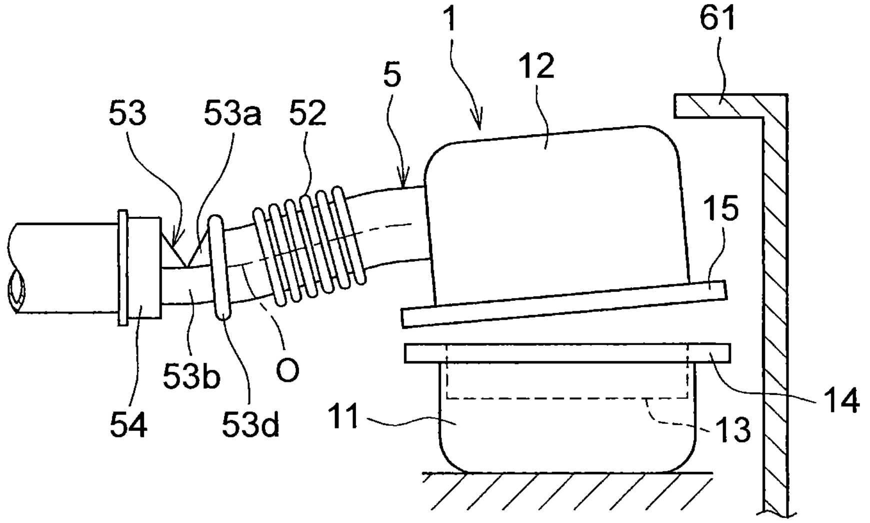
FIG. 5 is a schematic view for explaining the operation for opening the air cleaner, and is a view showing a state where buckling deformation has happened in the low-rigidity part of the air cleaner hose.
Figure 6:
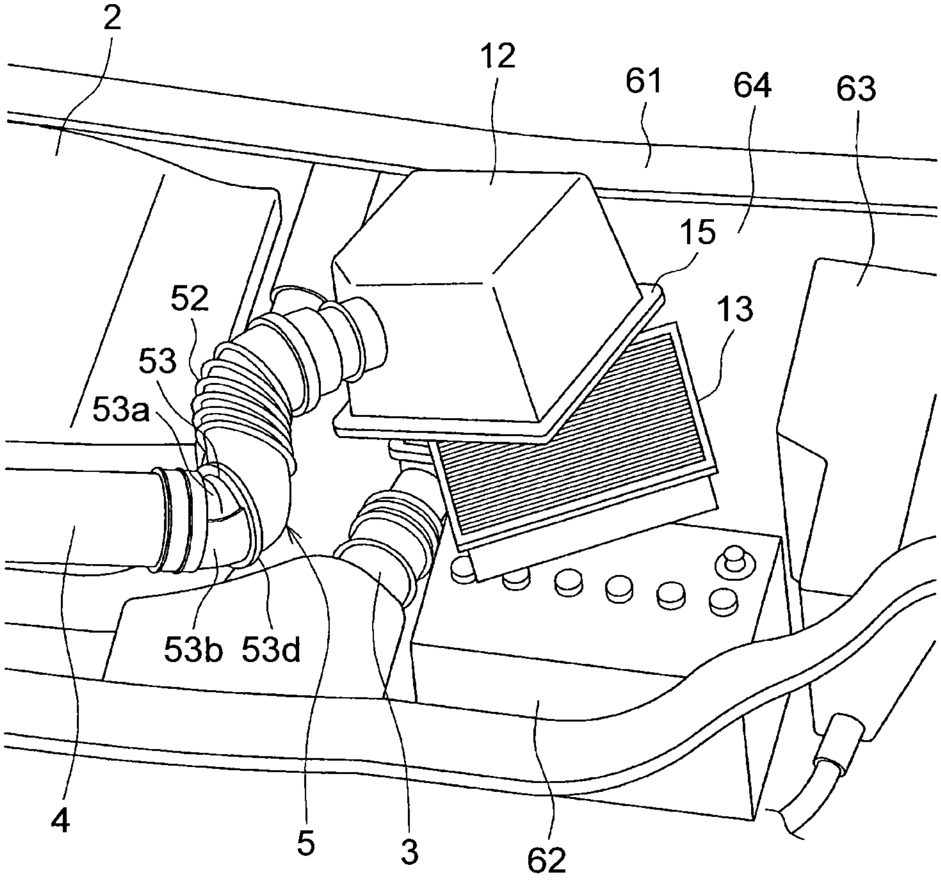
FIG. 6 is a view corresponding to FIG. 1, showing a state where an air cleaner element is removed.

Next, the operation for opening the air cleaner 1 according to the embodiment is explained by using FIG. 4 to FIG. 6. The operation for opening the air cleaner 1 is carried out when the air cleaner element 13 is cleaned or exchanged.

First of all, an engaged state of the engaging tools is released. The engaging tools engage the flanges 14, 15, which are formed in the outer edges of the air cleaner case 11 and the air cleaner cap 12, respectively. Thus, the air cleaner cap 12 is able to move relative to the air cleaner case 11.

Then, an operator applies a compressive load to the air cleaner hose 5 in a direction generally along the hose axis O in a state where the air cleaner cap 12 or the air cleaner hose 5 is held. Thus, the compressive load acts on the low-rigidity part 53*a*, and, when the compressive load reaches the buckling load of the low-rigidity part 53*a*, the low-rigidity part 53*a* has buckling deformation earlier than the high-rigidity part 53*b*. FIG. 4 is a schematic view showing a state before the low-rigidity part 53*a* has buckling deformation. FIG. 5 is a schematic view showing a state where the low-rigidity part 53*a* has the buckling deformation. Due to the buckling deformation of the low-rigidity part 53*a*, the linear dimension of the air cleaner hose 5 is reduced in the direction along the hose axis O. Thus, the air cleaner cap 12 moves to the front side of the vehicle body (the left side in FIG. 5) by a reduced amount of the linear dimension of the air cleaner hose 5.

Due to the movement towards the front side of the vehicle body, the air cleaner cap 12 is positioned on the front side of a space below the cowl 61 (see FIG. 5). This means that a space for the air cleaner cap 12 to dismount from the air cleaner case 11 (dismount upwardly) is ensured above the air cleaner cap 12.

In this state, the bellows part 52 is elastically deformed, and the air cleaner hose 5 is bent upwardly. Then, as shown in FIG. 6, the air cleaner cap 12 is dismounted from the air cleaner case 11 (dismounted upwardly) without interfering with the cowl 61. Hence, it is possible to remove the air cleaner element 13.

After clearing or exchange of the air cleaner element 13 is finished, the air cleaner cap 12 is mounted on the upper side of the air cleaner case 11 in a state where the air cleaner element 13 is housed in the air cleaner case 11. In such a case, the air cleaner cap 12 is mounted on the upper side of the air cleaner case 11 while the compressive load is acting on the air cleaner hose 5, and then the compressive load is released. In this way, the buckling deformation of the low-rigidity part 53*a* is released, and the original shape of the air cleaner hose 5 is restored. Then, the flanges 14, 15 of the air cleaner case 11 and the air cleaner cap 12 are engaged with each other by the engaging tools, and then the operation ends.

As explained so far, according to this embodiment, the compressive load in the direction along the hose axis O is used to cause the buckling deformation of the low-rigidity part 53*a*, thus reducing the linear dimension of the air cleaner hose 5 in the direction along the hose axis O. Then, due to the elastic deformation of the bellows part 52, the air cleaner hose 5 is bent in a state where the air cleaner cap 12 does not interfere with the cowl 61, and the air cleaner cap 12 is dismounted from the air cleaner case 11. Thus, it is possible to carry out the operation for opening the air cleaner 1 easily.

Further, by providing the rib 53*d* connected to the deformation part 53 on the upstream side in the intake flow direction, a compressive load in the direction along the hose axis O is easily applied to the low-rigidity part 53*a*. Thus, it is possible to cause the buckling deformation of the low-rigidity part 53*a* easily. Therefore, by applying the compressive load to the low-rigidity part 53*a* effectively, it is possible to specify the low-rigidity part 53*a* as a place where the buckling deformation is caused.

Next, modified example 1 is explained. In this modified example, the shape of the deformation part 53 is different from that in the foregoing embodiment. The rest of the structure and the operation for opening the air cleaner 1 are the same as those in the foregoing embodiment. Therefore, the explanation is given regarding only the shape of the deformation part 53.

Figure 7:
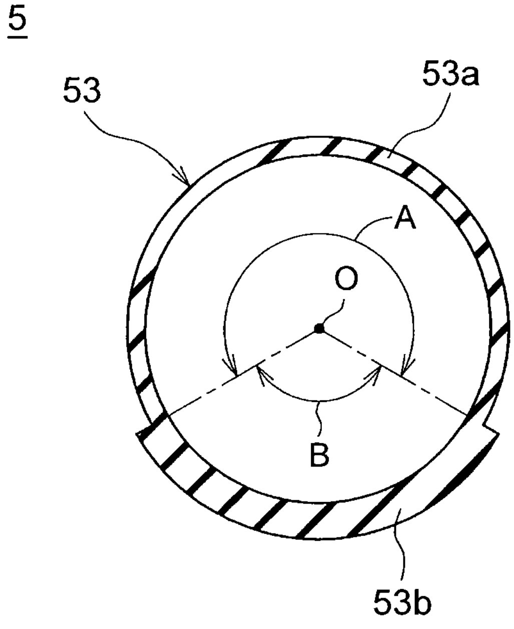
FIG. 7 is a view corresponding to FIG. 3, showing an air cleaner hose according to modified example 1.

FIG. 7 shows a sectional shape of a deformation part 53, which is a sectional view in a direction orthogonal to a hose axis O. As shown in FIG. 7, in this modified example, an angular range of a low-rigidity part 53*a* is set to be larger than an angular range of a high-rigidity part 53*b*. In FIG. 7, the angular range of the low-rigidity part 53*a*, that is angle A in the drawing, is 240°, and the angular range of the high-rigidity part 53*b*, that is angle B in the drawing, is 120°. These values are not limited to the above values, and are set as appropriate.

By setting a large angular range for the low-rigidity part 53*a* as stated above, it becomes possible to cause buckling deformation in the low-rigidity part 53*a* with a smaller compressive load compared to that in the foregoing embodiment, and workability for the operation for opening the air cleaner 1 is improved.

Next, modified example 2 is explained. In this modified example, the shape of the deformation part 53 is also different from that in the foregoing embodiment. The rest of the structure and the operation for opening the air cleaner 1 are the same as those in the foregoing embodiment. Therefore, the explanation is also given regarding only the shape of the deformation part 53.

Figure 8:
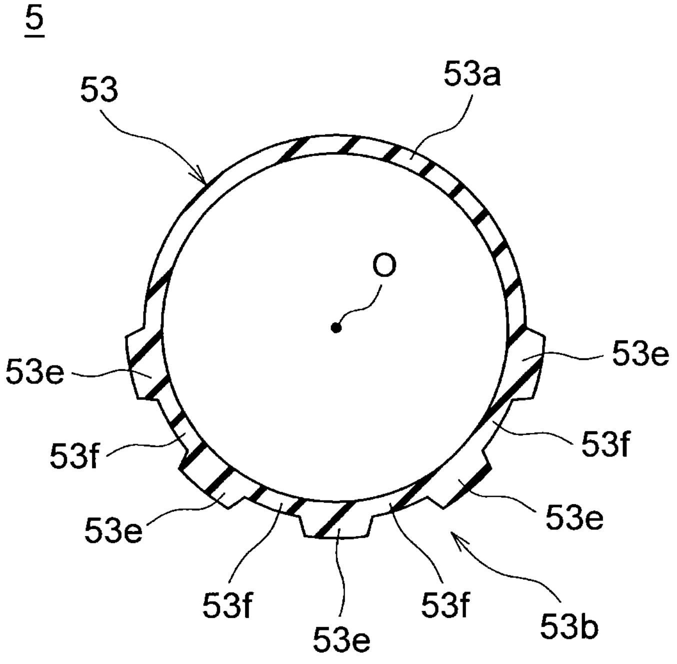
FIG. 8 is a view corresponding to FIG. 3, showing an air cleaner hose according to modified example 2.

FIG. 8 shows a sectional shape of a deformation part 53, which is a sectional view in a direction orthogonal to a hose axis O. As shown in FIG. 8, in this modified example, a thick part 53*e* and a thin part 53*f* are provided alternately in a high-rigidity part 53*b* in a circumferential direction. The thick part 53*e* and the thin part 53*f* extend in a longitudinal direction of an air cleaner hose 5, which is a direction along the hose axis O. The thickness dimension of the thick part 53*e* in a radial direction is set to be larger than a thickness dimension of the low-rigidity part 53*a*. Also, a thickness dimension of the thin part 53*f* in the radial direction generally coincides with the thickness dimension of the low-rigidity part 53*a*.

With such a structure, rigidity of the high-rigidity part 53*b* is higher than rigidity of the low-rigidity part 53*a*. In other words, rigidity of the low-rigidity part 53*a* is lower than rigidity of the high-rigidity part 53*b*. Therefore, when a compressive load acts on the deformation part 53 in a direction along the hose axis O, buckling deformation of the low-rigidity part 53*a* happens, and a linear dimension of the air cleaner hose 5 in the direction along the hose axis O is reduced by an amount of the buckling deformation.

In the embodiment and the respective modified examples explained above, the low-rigidity part 53*a* is formed in the upper region of the deformation part 53. The invention is not limited to this, and the low-rigidity part may be formed in a side region that is a region facing the outer side in the vehicle width direction or a lower region of the deformation part 53.

In the embodiment and the respective modified examples explained above, the deformation part 53 is formed between the bellows part 52 and the downstream-side fitting part 54. However, the deformation part may be formed between the bellows part 52 and the upstream-side fitting part 51. This means that the deformation part 53 only needs to be formed between the bellows part 52 and either one of end parts of the air cleaner hose 5.

In the embodiment and the respective modified examples explained above, explanation is given regarding the case where the air cleaner cap 12 is dismounted upwardly from the air cleaner case 11. A direction in which the air cleaner cap 12 is dismounted is not limited to the upward direction. When there is a space secured for the air cleaner cap 12 to be dismounted on the side by buckling deformation of the low-rigidity part 53*a*, the air cleaner cap 12 may be dismounted to the side.

In the embodiment and the respective modified examples explained above, the downstream-side fitting part 54 of the air cleaner hose 5 is fitted to the intake pipe 4, but may also be connected with a throttle body.

The invention is applicable to an air cleaner hose provided in an intake system of an automobile engine.

What is claimed is:

1. An air cleaner hose that is configured to be connected with an air cleaner cap, the air cleaner hose comprising:
- a bellows part; and
- a low-rigidity part positioned in a region between the bellows part and one end of the air cleaner hose, the low-rigidity part included in a part of the air cleaner hose in a circumferential direction, wherein
- buckling deformation of the low rigidity part happens when a compressive load in an axial direction of the air cleaner hose reaches a buckling load of the low-rigidity part, and the buckling load of the low-rigidity part with respect to the compressive load in the axial direction of the air cleaner hose is smaller than a buckling load of a region other than the low-rigidity part with respect to the compressive load.

2. The air cleaner hose according to claim 1, wherein
- the low-rigidity part is positioned between the bellows part and an end part of the air cleaner hose on a downstream side in an intake flow direction,
- a rib is provided on the air cleaner hose, the rib projects on a radially outer side of the air cleaner hose, and the rib is connected to the low-rigidity part on an upstream side in the intake flow direction.

3. The air cleaner hose according to claim 2, wherein
- rigidity of the rib is higher than rigidity of the low-rigidity part.

4. The air cleaner hose according to claim 1, wherein
- the low-rigidity part is thinner than the region other than the low-rigidity part in the circumferential direction.

5. The air cleaner hose according to claim 1, wherein the low-rigidity part is provided on an upper side of the air cleaner hose.

6. The air cleaner hose according to claim 2, wherein
- the rib extends circumferentially around the air cleaner hose, and
- the low-rigidity part is a circumferential section of the air cleaner hose that abuts the rib and is thinner in the radial direction than a remaining portion of the section.

* * * * *